US012147875B2

(12) United States Patent
Ladurini et al.

(10) Patent No.: US 12,147,875 B2
(45) Date of Patent: Nov. 19, 2024

(54) SYSTEMS AND METHODS FOR EVALUATING A BEHAVIOR OF A MACHINE-LEARNING ALGORITHM

(71) Applicants: Aaron R. Ladurini, Palm Bay, CA (US); Andrew W. Kom, Melbourne, FL (US); Rebecca A. Howard, Melbourne, FL (US)

(72) Inventors: Aaron R. Ladurini, Palm Bay, CA (US); Andrew W. Kom, Melbourne, FL (US); Rebecca A. Howard, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 1170 days.

(21) Appl. No.: 16/922,775

(22) Filed: Jul. 7, 2020

(65) Prior Publication Data
US 2022/0012624 A1 Jan. 13, 2022

(51) Int. Cl.
*G06N 5/045* (2023.01)
*G05D 1/00* (2006.01)
(Continued)

(52) U.S. Cl.
CPC ........... *G06N 20/00* (2019.01); *G05D 1/0088* (2013.01); *G05D 1/0221* (2013.01); *G05D 1/101* (2013.01); *G06N 5/01* (2023.01); *G06N 5/045* (2013.01)

(58) Field of Classification Search
CPC .......... G06N 20/00; G06N 5/01; G06N 5/045; G05D 1/0088; G05D 1/0221; G05D 1/101
See application file for complete search history.

(56) References Cited

U.S. PATENT DOCUMENTS 11,625,036 B2 * 4/2023 Halder ................ B60W 60/001
 701/2
2015/0217449 A1 * 8/2015 Meier .................. G05D 1/0033
 901/1
(Continued)

OTHER PUBLICATIONS

International Search Report from corresponding PCT/US2021/034740 mailed Sep. 15, 2021.
(Continued)

*Primary Examiner* — Tuyetlien T Tran
*Assistant Examiner* — Jianmei F Duckworth
(74) *Attorney, Agent, or Firm* — Tarolli, Sundheim, Covell & Tummino LLP

(57) ABSTRACT

A computer implemented method is described herein for post-execution evaluation of a machine-learning (ML) algorithm. The method can include receiving a post-execution version of the ML algorithm having a plurality of behavioral states. The method can include generating behavior identification data identifying a given behavioral state from the plurality of behavioral states of the ML algorithm. The given behavioral state can correspond to a decision-making state of the ML algorithm that the ML algorithm learned during an execution of the ML algorithm. A graphical user interface (GUI) can be generated based on the behavior identification data that includes a behavior object characterizing the given behavioral state of the ML algorithm. Behavior evaluation data can be generated based on a user's interaction with the behavior object. A learning process of the ML algorithm can be altered for future execution of the ML algorithm based on the behavior evaluation data.

19 Claims, 6 Drawing Sheets

(51) Int. Cl.
    *G06N 5/01*           (2023.01)
    *G06N 20/00*       (2019.01)

(56) References Cited

U.S. PATENT DOCUMENTS

| | | | | |
|---|---|---|---|---|
| 2017/0326726 | A1* | 11/2017 | Grotmol | B25J 9/1607 |
| 2021/0178578 | A1* | 6/2021 | Nakai | B25J 9/1671 |
| 2021/0312297 | A1* | 10/2021 | Francon | G06Q 10/0637 |
| 2021/0339389 | A1* | 11/2021 | Arcand | B25J 9/1661 |

OTHER PUBLICATIONS

FEITH: "Safe Reinforcement Learning in Flight Control", Jan. 30, 2020 (Jan. 30, 2020), pp. 1-98, XP55838371, Retrieved from the Internet: URL:http://resolver.tudelft.nl/uuid :07f53daa-b236-4bb9-b01 0-bc6654383744 [retrieved on Sep. 7, 2021]; Figures 2, 3.

Bastani, et al.: "Verifiable Reinforcement Learning via Policy Extraction"; 2' Jan. 4, 2019 (Jan. 24, 2019), pp. 1-13, XP55838386, Retrieved from the Internet: URL:https://arxiv.org/pdf/1805.08328. pdf [retrieved on Sep. 7, 2021] abstract figure 1.

FEITH: Safe Reinforcement Learning in Flight Control:, Jan. 30, 2020, pp. 1-98, XP55838381, Retrieved from the Internet on Mar. 7, 2024 at http://resolver.tudelft.nl/uuid:07f53daa-b236-4bb9-b010-bc6654383744.

Office Action: Issued on Feb. 20, 2024 for corresponding EP 21 734 653.5-1203.

\* cited by examiner

SYSTEMS AND METHODS FOR EVALUATING A BEHAVIOR OF A MACHINE-LEARNING ALGORITHM

TECHNICAL FIELD

This relates to systems and methods for evaluating a behavior of a machine-learning algorithm.

BACKGROUND

Machine learning is a type of artificial intelligence that "learns" as it identifies new patterns in data. The types of machine-learning algorithms differ in their approach, the type of data they input and output, and the type of task or problem that they are intended to solve. ML algorithms can be broadly classified into four types-supervised, semi-supervised, unsupervised, and reinforcement machine-learning algorithms.

SUMMARY

In an example, a computer implemented method for post-execution evaluation of a machine-learning (ML) algorithm can include receiving ML behavior data comprising a post-execution version of the ML algorithm having a plurality of behavioral states. The plurality of behavioral states can correspond to different decision-making states of the ML algorithm during execution of the ML algorithm. The computer implemented method can further include evaluating the plurality of behavioral states by comparing each of the plurality of behavioral states to a library of approved behavioral states for the ML algorithm to identify a given behavioral state from the plurality of behavioral states of the ML algorithm. The given behavioral state can correspond to a decision-making state of the ML algorithm that is not part of the library of approved behavioral states for the ML algorithm. The computer implemented method can further include generating behavior evaluation data based on the evaluation. The behavior evaluation data can be indicative that the given behavioral state is not an approved behavioral state for the ML algorithm. The computer implemented method can further include updating the ML algorithm to alter a learning process of the ML algorithm by modifying the learned behavioral state of the ML algorithm to provide an updated ML algorithm based on the behavior evaluation data.

In another example, a system for post-execution evaluation of a ML algorithm includes memory storing machine readable instructions and data. The data can include a post-execution version of the ML algorithm with a plurality of behavioral states. The plurality of behavioral states can correspond to different decision-making states of the ML algorithm during execution of the ML algorithm. The system further includes one or more processors to access the memory and execute the machine readable instructions. The machine readable instructions can include a ML evaluator module, a decision tree module and a ML behavior adjustment module. The ML evaluator module can be programmed to generate behavior identification data identifying a given behavioral state from the plurality of behavioral states of the ML algorithm. The given behavioral state can correspond to a decision-making state of the ML algorithm that the ML algorithm learned during the execution of the ML algorithm. The decision tree module can be programmed to generate a graphical user interface (GUI) that includes a plurality of graphical objects that include a behavior object characterizing the given behavioral state of the ML algorithm. The behavior object can be generated based on the behavior identification data. The decision tree module can further be programmed to generate behavior evaluation data based on an interaction with the behavior object by a user via an input device. The behavior evaluation data can indicate one of that the given behavioral state of the ML algorithm is an approved behavioral state for the ML algorithm, that the given behavioral state of the ML algorithm is not an approved behavioral state for the ML algorithm and an update to a learning process for the given behavioral state for the ML algorithm. The ML behavior adjustment module is programmed to update the ML algorithm to alter the learning process of the ML algorithm based on the behavior evaluation data.

In further examples, one or more non-transitory computer-readable media can be employed to include instructions that can be executed by a processor. The instructions can be programmed to perform a method for evaluation of a ML algorithm that is programmed to execute on a navigation and control system (NCS) of an unmanned vehicle (UV) configured to perform a mission. The method can include receiving ML behavior data that includes a post-execution version of the ML algorithm with a plurality of behavioral states. The plurality of behavioral states can correspond to different decision-making states of the ML algorithm during execution of the ML algorithm. Each decision making state of the ML algorithm can cause a respective change to a learning process of the ML algorithm during the mission being performed by the UV. The method can further include generating behavior identification data identifying a given behavioral state among the plurality of behavioral states of the ML algorithm. The given behavioral state can correspond to a respective decision-making state of the ML algorithm that the ML algorithm developed during the mission being performed by the UV. The method can further include generating a GUI that includes a plurality of graphical objects that includes a behavior object. The behavior object can characterize the given behavioral state of the ML algorithm. The behavior object can be generated based on the behavior identification data. The method can further include generating behavior evaluation data based on an interaction with the behavior object via an input device by a user. The behavior evaluation data can be indicative of one of that the given behavioral state of the ML algorithm is an approved behavioral state for the ML algorithm, that the given behavioral state of the ML algorithm is not an approved behavioral state for the ML algorithm, an update to the learning process for the given behavioral state of the ML algorithm. The method can further include updating the ML algorithm to alter the learning process of the ML algorithm based on the behavior evaluation data to provide an updated ML algorithm for a subsequent mission performed by the UV.

DETAILED DESCRIPTION

Figure 1:
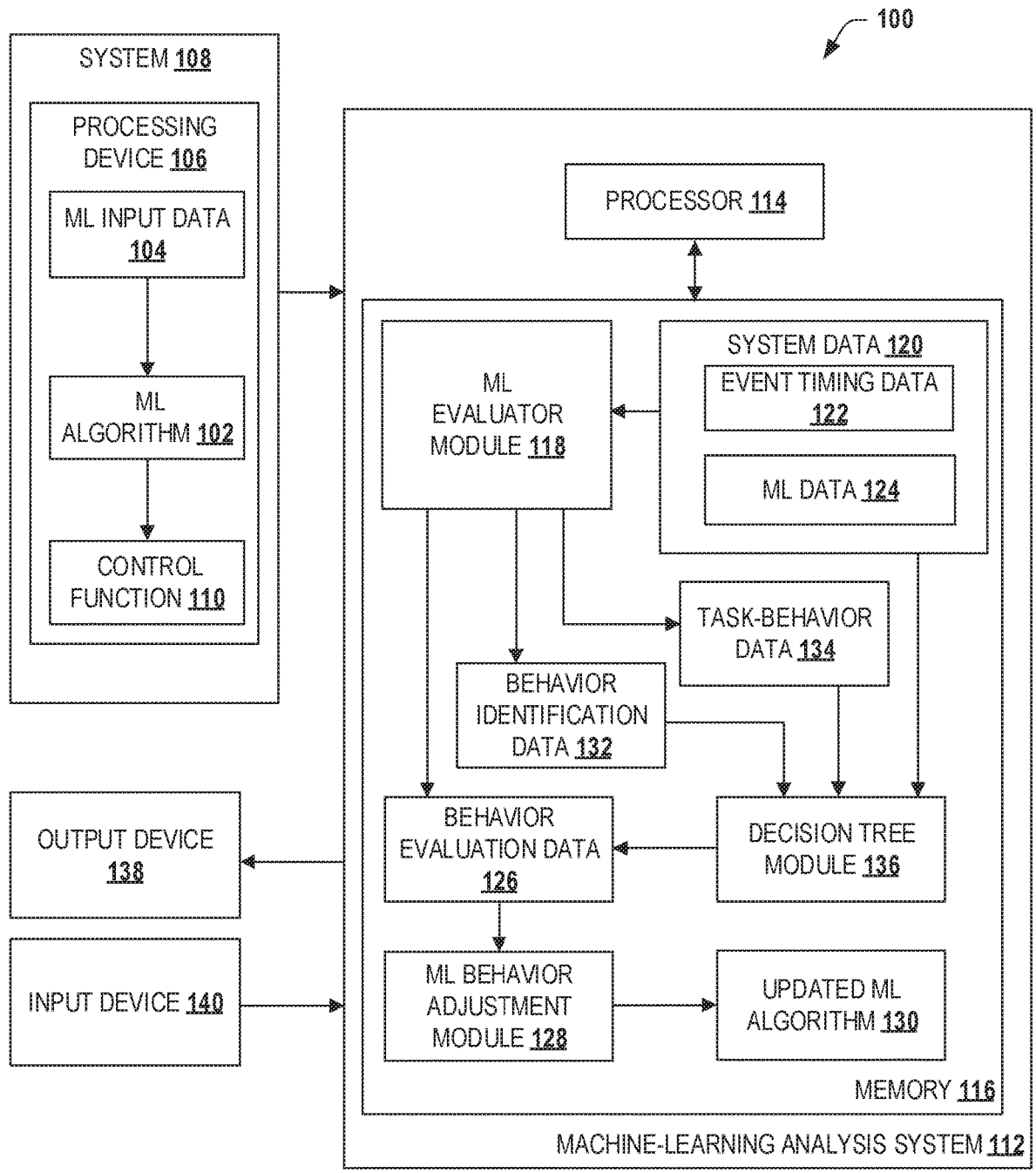
FIG. 1 illustrates an example environment for implementing machine-learning (ML) algorithm behavior evaluation.

This relates to systems and methods for evaluating a behavior of a machine-learning (ML) algorithm. In some examples, a ML analysis system can be employed to evaluate postmortem (e.g., after a period of time since a previous employment of the ML algorithm) a performance of the ML algorithm. The evaluation can include determining behavioral characteristics of the ML algorithm, such that a behavior of the ML algorithm can be validated (e.g., approved, modified, or deleted). The term "behavior" as used herein with respect to the ML algorithm refers to a learning process (e.g., a decision-making process) of the ML algorithm. During employment of the ML algorithm, a state of the learning process can change (e.g., update), such that at least one parameter of the learning process is updated. Each different state of the learning process can be referred to herein as a behavioral state. Thus, the ML algorithm can have a plurality of behavioral states and each state can correspond to an updated version of the learning process of the ML algorithm. Thus, as the learning process of the ML algorithm evolves during use, each evolution (e.g., change) can result in the ML algorithm updating the at least one parameter to a new value.

In some examples, the ML analysis system includes a ML evaluator module. The ML evaluator module can be configured to evaluate each behavioral state of the ML algorithm, such as, for example, to identify a learned behavioral state (e.g., the new machine code) among the plurality of behavioral states. The term "learned behavioral state" as used herein refers to a state of the learning process of the ML algorithm that the ML algorithm developed since being employed. The ML evaluator module can be programmed to evaluate behavioral states of the ML algorithm to determine whether the learned behavioral state is an approved behavioral state. The term "approved behavioral state" as used herein refers to a state of the learning process of the ML algorithm that has been approved. In some examples, the ML evaluator module can be programmed to compare each behavioral state to a library of approved behavioral states for the ML algorithm to determine whether each behavioral state is an approved behavioral state for the ML algorithm. The ML evaluator module can be programmed to output behavior evaluation data based on the comparison. The behavior evaluation data can indicate that the learned behavior has been approved or not approved. In some examples, the behavior evaluation data can include information for updating the learned behavioral state of the ML algorithm, as described herein. For example, the behavior evaluation data can specify a new value for the at least one parameter associated with the learned behavioral state, such as for modification of the learned behavioral state to provide a modified version of the learned behavioral state.

In some examples, the ML analysis system includes a ML behavioral adjustment module. The ML behavioral adjustment module can be programmed to employ the behavior evaluation data to update the ML algorithm to alter the learning process of the ML algorithm and thus provide an updated ML algorithm. The updated ML algorithm can correspond to a version of the ML algorithm in which at least one behavioral state of the ML algorithm has been changed. In some examples, the ML analysis system includes a decision tree module. The decision tree module can be programmed to generate a decision tree graphical user interface (GUI) with an interactive timeline for approval, modification, and deletion of the learned behavioral state of the ML algorithm. The ML behavioral adjustment module can be programmed to update the ML algorithm based on a user's interaction with the decision tree GUI to provide the updated the ML algorithm, as described herein.

Accordingly, the system and methods described herein allow for postmortem analysis of the ML algorithm, such that the learned behavioral states of the ML algorithm can be validated (e.g., approved, modified, or deleted). The validation can be based on a library of approved behavioral states for the ML algorithm or a user's interaction with the decision tree GUI. The decision tree GUI enables the user to analyze the algorithms decision-making process and identify conditions (e.g., external conditions, such as environmental conditions) that caused the ML algorithm to provide a particular outcome. The user can alter the learning process by deleting or modifying the ML algorithm via the decision tree GUI to remove the learned behavioral state. Updating a ML algorithm is a time consuming and skill intensive process, due to the complex nature of the user having to review thousands of lines of code to determine behavioristic changes of the ML algorithm. By employing the ML analysis system, as described herein, the user can determine how the ML algorithm is behaving more efficiently and does not require that the user understand a native coding language in which the ML algorithm was prepared.

FIG. 1 illustrates an example environment 100 for implementing machine-learning (ML) algorithm behavior evaluation. In some examples, a ML algorithm 102 can be implemented as an unsupervised learning algorithm, a supervised learning algorithm, a semi-supervised learning algorithm, or as a reinforcement learning algorithm depending on an application of the ML algorithm 102. Examples are presented herein wherein the ML algorithm 102 is implemented in an autonomous vehicle environment, however, the examples herein should not be construed or limited to only autonomous vehicle environments. The ML algorithm 102 can be programmed to receive ML input data 104 and process the ML input data 104 to provide outcome data. The ML algorithm 102 can be implemented as code (e.g., machine code) corresponding to set of instructions that can be executed in a corresponding application environment on a processing device 106, such as a computer (e.g., one or more processors of the computer), an embedded system, a vehicle control system (e.g., a controller), etc. The processing device 106 can be implemented on a system 108. The processing device 106 can include a control function 110 (e.g., a set of one or more routines) that can be programmed to control an action of the system 108.

The ML algorithm 102 can be employed to control the performance of a task being implemented by the control function 110. By way of example, the task can include flight control, light control, scheduling computer resources, robotics control, optimization of chemical reactions, news recommendations, etc. In some examples, during the execution of the task, the ML algorithm 102 can be programmed to receive the ML input data 104 and provide the outcome data to the control function 110 based on the ML input data 104. The outcome data can include a prediction value, a classification value, a recommendation value, a system parameter value, etc. Thus, the value of the outcome data can be based on the corresponding application environment in which the ML algorithm 102 is used. The ML input data 104 can correspond to any type of data that the ML algorithm 102 can process to provide the outcome to the control function 110 for control of the system 108.

The ML algorithm 102 can be employed on the system 108 and execute on the processing device 106. The ML algorithm 102 can update an internal learning process (e.g., one or more models) for providing the outcome data based on the ML input data 104. Each update of the internal decision-making process can correspond to updating at least one parameter of the decision-making process. A state of the learning process can change (e.g., update) during execution, such that the at least one parameter of the learning process is updated. Each different state of the learning process can be referred to herein as a behavioral state. Thus, the ML algorithm 102 can have a plurality of behavioral states and each state can correspond to an updated version of the learning process of the ML algorithm 102. As the learning process of the ML algorithm 102 evolves during use, each evolution (e.g., change) can result in the ML algorithm 102 updating the at least one parameter to a new value. In some examples, the at least one parameter includes a weight, a vector (e.g., a support vector), a coefficient, etc. As described herein, each behavioral state of the ML algorithm 102 can be evaluated (e.g., via a post-mortem analysis), such that behavioral states of the ML algorithm 102 can be validated (e.g., approved, deleted or modified) for future use of the ML algorithm 102 in the system 108.

In some examples, a ML analysis system 112 can be employed to evaluate a behavioral performance of the ML algorithm 102, such as, for example, to identify the learned behavioral state among the behavioral states of the ML algorithm 102. The ML analysis system 112 can validate the learned behavioral state, as described herein. The ML analysis system 108 includes a processor 114. The processor 114 can access a memory 116 of the ML analysis system 112. The memory 116 can include machine readable instructions that can be representative of a program and that can be executed by the processor 114, such as to implement one or more functions, as described herein.

The processor 114 can execute the machine readable instructions to implement a ML evaluator module 118. In some examples, the ML evaluator module 118 can be programmed to receive system data 120 for the system 108. The system data 120 can characterize actions implemented by the system 108. The system data 120 can include task information characterizing tasks implemented by the control function 110. In some examples, the system data 120 includes event timing data 122. The event timing data 122 can characterize timing information for events with respect to the system 108. The events can include ML events, such as receiving the ML input data 104 at the ML algorithm 102 and providing the outcome data to the control function 110, and further can include control function events, such as receiving the outcome data at the control function 110. Thus the event timing data 122 can identify a time at which each event occurred with respect to the ML algorithm 102 and the control function 110. In some examples, the event timing data 122 includes system events, such as a respective time for each action that was implemented by the system 108. In some examples, the system includes an event logger, and the event logger can be configured to monitor and log each event and a time for each event implemented by the ML algorithm 102 and the control function 110. The system data 120 can further include ML data 124 characterizing behavioral states of the ML algorithm 102. Thus, the ML data 124 can characterize the at least one parameter of the learning process for each behavioral state of the ML algorithm 102. In some examples, the ML data 124 includes the ML algorithm 102.

In some examples, the ML evaluator module 118 is programmed to evaluate each behavioral state of the ML algorithm 102 to determine whether each behavioral state is an approved behavioral state for the ML algorithm 102 based on the ML data 124. In some examples, the ML evaluator module 118 evaluates the learned behavioral state to determine whether the learned behavioral state is an approved behavior of the ML algorithm 102. In some examples, the ML evaluator module 118 can be programmed to update the learned behavioral state and thus not permit the learning process to employ the learning behavioral state in future use corresponding to deleting the learned behavioral state.

In some examples, the ML evaluator module 118 can include a library of approved behavioral states. The library of approved behavioral states can include approved behavioral states for the ML algorithm 102. The ML evaluator module 118 can be programmed to compare each behavioral state of the ML algorithm 102 characterized by the ML data 124 to the library of behavioral state to determine whether each behavior is an approved behavior of the ML algorithm 102. For example, the ML evaluator module 118 can be programmed to compare the at least one parameter for the learned behavioral state relative to parameters of approved behavioral states for the ML algorithm 102. The ML evaluator module 118 can be programmed to output behavior evaluation data 126 based on the comparison. The behavior evaluation data 126 can indicate that the learned behavioral state has not been approved.

In some examples, the memory 116 employs a ML behavior adjustment module 128. The ML behavior adjustment module 128 can be programmed to employ the behavior evaluation data 126 to update the learned behavioral state of the ML algorithm 102 to provide an updated ML algorithm 130. The updated ML algorithm 130 can correspond to a version of the ML algorithm 102 in which a behavioral state of the ML algorithm has been altered (e.g., modified). The ML behavior adjustment module 128 can be programmed to communicate with the ML algorithm 102. The ML behavior adjustment module 128 can be programmed to interface with the ML algorithm 102 and update the behavioral state of the ML algorithm 102. For example, the ML behavior adjustment module 128 can be programmed to delete the learned behavioral state (e.g., by updating at least one parameter associated with the learned behavioral state) to provide the updated ML algorithm 130 based on the behavior evaluation data 126.

In some examples, the ML evaluator module 118 is programmed to output behavior identification data 132. The behavior identification data 132 can identify the learned behavioral state among the behavioral states of the ML algorithm 102. In some examples, the ML evaluator module 118 is programmed to associate respective tasks of the control function 110 with corresponding actions implemented by the system 108, and further associate the respective tasks with corresponding behavioral states of the ML algorithm 102 based on the system data 120. For example, the ML evaluator module 118 is programmed to employ the event timing data 122 for each event of the control function 110 and the ML algorithm 102 to identify a subset of the ML input data 104. The ML evaluator module 118 can be programmed to associate the subset of the ML input data 104 with a respective outcome of the outcome data provided by the ML algorithm 102 based on the event timing data 122.

Because the time of the respective outcome being provided by the ML algorithm 102 is known and a time of the respective outcome being received by the control function 110 is known based on the event timing data 122, the ML evaluator module 118 can associate the subset of the ML input data with a corresponding task being implemented by the control function 110. Thus, the ML evaluator module 118 can be programmed to associate respective tasks being implemented by the control function 110 with respective behavioral states of the ML algorithm and the subset of the ML input data 104 based on the event timing data 122. The ML evaluator module 118 can be programmed to provide task-behavior data 134 characterizing the association of the tasks with behavioral states of the ML algorithm 102 and corresponding subsets of the ML input data 104.

In some examples, the memory 116 includes a decision tree module 136. The decision tree module 136 can be programmed to provide a decision tree GUI with an interactive timeline for validation of the learned behavioral state of the ML algorithm 102. The decision tree module 136 can be programmed to provide the decision tree GUI to an output device 138 for displaying thereon of the decision tree GUI. The decision tree module 136 can be programmed to generate the decision tree GUI based on the system data 120, the behavior identification data 132, and the task-behavior data 134. The user can interact with the interactive timeline to validate the learned behavioral state of the ML algorithm 102. The interactive timeline allows the user to visualize the control information for the system 106, the task information for the control function, and the learned behavioral state of the ML algorithm 102. In some examples, the user can interact with the decision tree GUI to approve, modify, or delete the learned behavioral state of the ML algorithm 102. The user can employ an input device 140 to interact with the decision tree GUI.

In some examples, the graphical timeline can include interactive time objects that the user can interact with to set an execution time window for the control function 110. The execution time window can correspond to a period of time during execution (e.g., runtime) of the control function 110. By setting the execution time window, the decision tree module 136 can be programmed to update the decision tree GUI to display one or more task objects corresponding to one or more tasks executed by the control function 110 that caused the system 108 to implement one or more actions at times within the execution time window. In some examples, the decision tree GUI includes condition objects characterizing conditions of the system 108 and task objects characterizing tasks implemented by the control function 110. The decision tree module 136 can be programmed to parse the system data 120 to identify relevant information for populating the task and condition objects.

In some examples, the decision tree module 136 can be programmed to provide the decision tree GUI with a behavior object. The behavior object can characterize the learned behavioral state of the ML algorithm 102. The behavior object can be associated with a task object that corresponds to a respective task that is associated with the learned behavioral state of the ML algorithm 102.

In some examples, the behavior object includes an approve object, a delete object and a modify object. The user can interact with the approve object to approve the learned behavioral state of the ML algorithm 102 for future use. The decision tree module 136 can be programmed to store the learned behavioral state as part of the library of approved behavioral states for the ML algorithm 102. Thus, in future evaluations of the ML algorithm 102, the ML evaluator module 118 can be programmed to process the learned behavioral state as an approved behavioral state, and thus not require that the user approve the behavioral state for the ML algorithm 102 via the decision tree GUI. In some examples, the user can interact with the delete object to delete the learned behavioral state from the ML algorithm 102. The decision tree module 136 can be programmed to generate the behavior evaluation data 126 to indicate that the learned behavior is to be deleted. The ML behavior adjustment module 128 can be programmed to update the learned behavioral state for the ML algorithm to delete the learned behavioral state of the ML algorithm 102, as described herein.

In some examples, the user can interact with the modify object. The decision tree module 136 can be programmed to alert the user and request update information for the at least one parameter for the learned behavioral state of the ML algorithm for the respective task being implemented by the control function 110. Thus, the user can modify (e.g., update) parameters of the learned behavioral state for the ML algorithm 102 for future use. The decision tree module 136 can be programmed to generate the behavior evaluation data 126 to indicate modification of the at least one parameter for the learned behavior of the ML algorithm 102, such as for the respective task. The ML behavior adjustment module 128 can be programmed to update the at least one parameter for the learned behavioral state of the ML algorithm 102 to provide the updated ML algorithm 130.

Thus, the ML analysis system 112 allows for postmortem analysis of the ML algorithm 102, such that learned behavioral states of the ML algorithm 102 can be validated (e.g., approved, modified, or deleted). The validation can be based on the library of approved behavioral states or a user's interaction with the decision tree GUI. The decision tree GUI enables the user to select and examine parameters of the decision-making process of the ML algorithm 102 that caused the ML algorithm 102 to behave in a new way. The decision tree GUI enables the user to analyze the decision-making process of the ML algorithm 102 and identify conditions that caused the ML algorithm 102 to provide a particular outcome. The user can alter the ML algorithm 102 learning process via the decision tree GUI to ensure that the ML algorithm 102 will operate as desired in the future. Updating of a ML algorithm is a time consuming and skill intensive process, due to a complex nature of the user having to review thousands of lines of code to determine behavioristic changes of the ML algorithm. By employing the ML analysis system 112, the user can determine how the ML algorithm is behaving more efficiently and does not require that the user understand a native coding language in which the ML algorithm was prepared.

Figure 2:
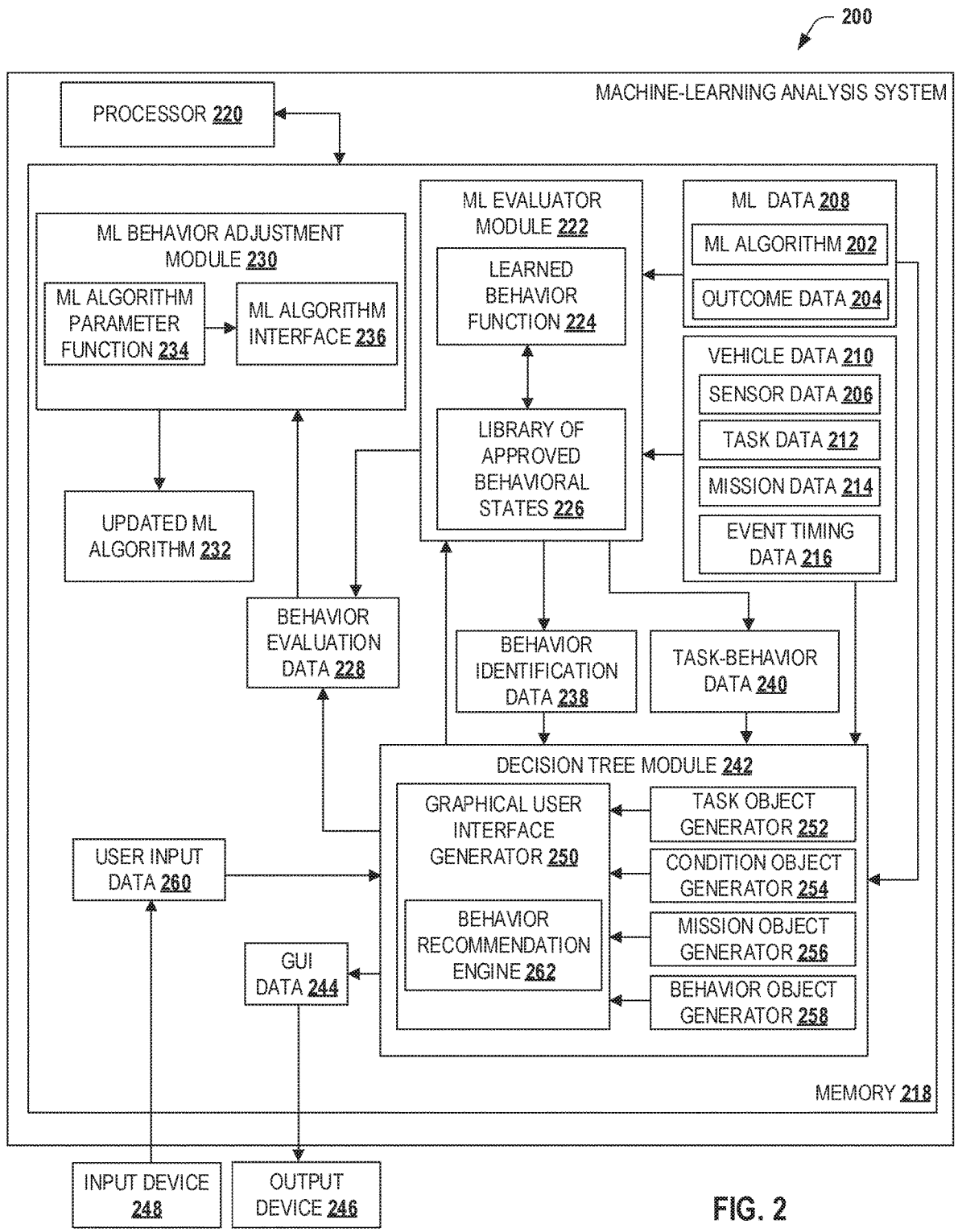
FIG. 2 illustrates an example of a ML analysis system.

FIG. 2 illustrates an example of a ML analysis system 200. The ML analysis system 200 can be employed to evaluate a behavior of a ML algorithm 202. The ML algorithm 202 can correspond to the ML algorithm 102, as illustrated in FIG. 1. Thus, the ML analysis system 200 can correspond to the ML analysis system 112, as illustrated in FIG. 1. Therefore, reference may be made to the example of FIG. 1 in the following description of the example of FIG. 2. The ML analysis system 200 can be employed for post-execution evaluation of the ML algorithm 202 to identify learned behavioral states of the ML algorithm 202 that the ML algorithm 202 developed during execution.

During a runtime of the ML algorithm 202, a learning process of the ML algorithm 202 can change from a baseline learning process. The baseline learning process can correspond to a decision-making process state (e.g., a set of parameters) that the ML algorithm 202 has before execution. In some examples, the ML algorithm 202 is programmed to execute on a navigation and control system (NCS) of an UV.

The UV can correspond to an unmanned aerial vehicle (UAV) or an unmanned surface vehicle (USV) (e.g., unmanned ground or water vehicle). In some examples, the UV can be configured to operate without or with limited human intervention. During operation, the UV can be configured to implement vehicle movements based on commands issued by the NCS to carry out a mission (e.g., an assignment, for example, a reconnaissance assignment). The NCS can be configured to implement tasks and issue commands to control actions (e.g., vehicle movements) of the UV based on outcome data 204 provided by the ML algorithm 102.

The ML algorithm 202 can be programmed to execute onboard the NCS. Thus, the ML algorithm 202 can be programmed to control a vehicle performance of the UV. By way of example, the ML algorithm 202 can be programmed to control a trajectory of the UV, a location of the vehicle, a velocity of the vehicle, etc. The ML algorithm 202 can be programmed to provide the outcome data 204 based on sensor data 206 provided by sensors employed on the UV. The outcome data 204 can include a prediction value, a classification value, a recommendation value, a system parameter value, etc. As an example, the outcome data 204 can include a pitch angle value for the UV. As such, the actions of the UV can be controlled by the ML algorithm 202 based on the sensor data 206 during the mission.

By way of further example, during the mission, a vehicle performance logger (e.g., recorder) implemented on the UV can be programmed to provide time-stamped information for events. The events can include ML events, NCS events, and UV events. The events can be correlated based on the time-stamped information for the generation of an interactive timeline to allow a user to evaluate (e.g., interrogate) post-execution (e.g., after the mission) how the ML algorithm behaved during the mission. For example, after the mission (e.g., once the mission has been partially or fully completed), the ML data 208 and vehicle data 210 can be retrieved (e.g., downloaded) from the UV. The ML data 208 can include a post-execution version of the ML algorithm 202 that can include a plurality of behavioral states and the outcome data 204. The plurality of behavioral states can correspond to different decision-making states of the ML algorithm 202.

In some examples, during the mission, a ML state logger can be programmed to capture changes in a decision-making process of the ML algorithm 202 during execution. Each change in the decision-making process can correspond to a state of parameters of the ML algorithm 202 at an instance of time. The ML state logger can be programmed to capture (e.g., record) the state of the parameters (e.g., values that the parameters had, such as weight values, etc.), and thus capture each version of the decision-making process of the ML algorithm 202. The captured parameter states can be stored as part of the ML data 208, such as part of the ML algorithm 202. Accordingly, the post-execution version of the ML algorithm 202 includes the plurality of behavioral states that can correspond to captured parameter states of the ML algorithm 202. In some examples, the plurality of behavioral states include a learned behavioral state corresponding to a new decision-making process that the ML algorithm 102 employed during the mission (e.g., during execution).

The vehicle data 210 can include the sensor data 206 and task data 212. The task data 212 can characterize tasks (e.g., flight tasks) implemented by the NCS to control the actions (e.g., the movement) of the UV. As an example, the task data 212 can characterize altitude tasks (e.g., climb to a set altitude), engine thrust tasks (e.g., increase an engine thrust of the UV from a first thrust to a second thrust), pitch angle tasks (e.g., decrease a pitch angle from a first-pitch angle to a second-pitch angle), heading tasks (e.g., change a heading from a first heading to a second heading), etc. The above task information is exemplary and is not intended to encompass all possible tasks that can be implemented by the NCS to control the actions of the UV. In some examples, the vehicle data 210 includes mission data 214. The mission data 214 can characterize the mission performed by the UV. Thus, the mission data 214 can include mission objectives (e.g., goals), and sub-mission tasks carried out to implement the mission (e.g., such as powering on sensors of a sensor system, initiating a detection routine for object detection, implementing imaging matching, executing target locking, etc.). In some examples, the ML data 208 and the vehicle data 210 can collectively correspond to the system data 120, as illustrated in FIG. 1.

In further examples, the vehicle data 210 includes event timing data 216. The event timing data 216 can correspond to the event timing data 122, as illustrated in FIG. 1. The event timing data 216 can identify times at which each of the ML, NCS, and UV events occurred during the mission. Thus, the event timing data 216 can identify times at which software events occurred during the mission. The event timing data 216 can be employed to associate (e.g., correlate) the sensor data 206, the task data 212, and the mission data 214 for the generation of the interactive timeline, as described herein. In some examples, the event timing data 216 can be employed to correlate the learned behavioral state of the ML algorithm 102 with respect to the task data 212 for the generation of the interactive timeline.

As an example, the sensor data 206 can include sensor information characterizing an environment in which the vehicle is employed, a vehicle performance, and a vehicle condition during the mission. Thus, the sensor data 206 can include environmental data, vehicle performance data, and vehicle condition data. Each set of sensor data can be provided by corresponding sensors employed on the UV during the mission. By way of example, the environmental data can characterize environmental conditions that the UV experienced during the mission, such as a wind-speed, a pressure, a turbulence forecast, a weather forecast, a temperature, a chance of precipitation, a humidity, etc. The vehicle performance data can characterize a heading of the UV during the mission, an attitude of the UV during the mission, including roll, pitch, and yaw, a speed of the UV (e.g., a horizontal and vertical speed) during the mission, such as a ground speed, location information of the UV (e.g., a global positioning coordinate (GPS) location) during the mission, altitude climbs and descent rates during the mission, etc. The vehicle condition data can characterize an amount of fuel in a fuel tank of the UV during the mission, a fuel usage rate during the mission, etc. The above sensor information of the sensor data 206 is exemplary and is not intended to encompass all possible sensor information that can be provided to the ML analysis system 200 as part of the vehicle data 210.

In some examples, the ML analysis system 200 includes a memory 218 to store the ML data 208 and the vehicle data 210. A processor 220 of the ML analysis system 200 can access the memory 218 to execute machine readable instructions that can be representative of a program. The processor 220 can execute the machine readable instructions to implement a ML evaluator module 222. The ML evaluator module 222 can correspond to the ML evaluator module 118, as illustrated in FIG. 1. In some examples, the ML evaluator module 222 is programmed to evaluate each behavioral state of the ML algorithm 202 to determine whether each behavioral state is an approved behavioral state for the ML algorithm 202. The ML evaluator module 222 employs a learned behavior function 224. The learned behavior function 224 can be programmed to evaluate each behavioral state of the ML algorithm 202 relative to a library of approved behavioral states 226 for the ML algorithm 202. For example, the learned behavior function 224 can be programmed to compare at least one parameter of each learned behavioral state of the ML algorithm 202 relative to parameters of the approved behavioral states of the library 226 to identify the learned behavioral state. The learned behavior function 224 can be programmed to output behavior evaluation data 228 based on the comparison. The behavior evaluation data 228 can indicate that the learned behavioral state is not an approved behavioral state for the ML algorithm 202.

In some examples, the memory 218 employs a ML behavior adjustment module 230. The ML behavior adjustment module 230 can be programmed to employ the behavior evaluation data 228 to update the decision-making process for the learned behavioral state of the ML algorithm 202 and thus provide an updated ML algorithm 232. The ML behavior adjustment module 230 can be programmed to alter the learning process of the ML algorithm 202 based on the behavior evaluation data 228. The updated ML algorithm 232 can correspond to an updated post-execution version of the ML algorithm 202 in which a behavioral state of the ML algorithm has been altered. The ML behavior adjustment module 230 includes a ML algorithm parameter function 234 and a ML algorithm interface 236. The ML algorithm parameter function 234 can employ the ML algorithm interface 236 to interface with the ML algorithm 202 to update the at least one parameter for the learned behavioral state of the ML algorithm 202 based on the behavior evaluation data 228.

For example, if the behavior evaluation data 228 indicates that the learned behavioral state of the ML algorithm 202 is not approved, the ML algorithm parameter function 234 can be programmed to access and update the at least one parameter for the learned behavioral state of the ML algorithm 202, such that the at least one parameter is not considered (e.g., weighted at a lower value, such as zero) in a future execution of the ML algorithm 202 corresponding to deleting the learned behavioral state of the ML algorithm 202. Thus, the ML algorithm parameter function 234 can be programmed to modify the ML algorithm 202 by changing the at least one parameter for the learned behavioral state of the ML algorithm 202 to provide the updated ML algorithm 232.

In some examples, the ML evaluator module 222 can be programmed to output behavior identification data 238. The behavior identification data 238 can identify the learned behavioral state among the plurality of behavioral states of the ML algorithm 202, as described herein. In some examples, the ML evaluator module 222 can be programmed to compare the ML algorithm 202 to a baseline ML algorithm to identify the learned behavioral state. In these examples, the baseline ML algorithm can correspond to the library of approved behavioral states 226 for the ML algorithm 202. Thus, the ML evaluator module 222 can be programmed to compare a code of the ML algorithm 202 to a code of the baseline ML algorithm and identify a behavioral difference corresponding to the learned behavioral state to provide the behavior identification data 238.

In some examples, the ML evaluator module 222 is programmed to employ the event timing data 216 to associate respective tasks of the task data 212 with corresponding sensor information of the sensor data 206 generated during the mission of the UV, such that respective behavioral states that the ML algorithm 102 had during the mission (e.g., execution of the ML algorithm 202) can be associated with at least one task of the task data 212. The ML evaluator module 222 can be programmed to associate each task (e.g., task event) that occurred during the mission with respective sensor information of the sensor data 206 generated during the mission based on a time for each task event and a time at which respective sensor data was generated by sensors of the UV and received by processing components of the UV (e.g., the NCS, the ML algorithm 202, etc.). In some examples, the ML evaluator module 222 can be programmed to employ the event timing data 216 to associate corresponding outcomes of the outcome data 204 with the respective tasks of the task data 212. For example, the ML evaluator module 222 can be programmed to determine a time at which a subset of the sensor data 206 was received and a time at which a corresponding outcome of the outcome data 204 was provided based on the event timing data 216. By determining the times at which the ML algorithm 202 received the subset of the sensor data 206 and provided the corresponding outcome based on the subset of the sensor data 206, the ML evaluator module 222 can be programmed to identify a corresponding behavioral state of the ML algorithm 202.

Because the time at which the subset of the sensor data 206 was received at the ML algorithm 202 is known and times at which the corresponding outcome was provided by the ML algorithm 202 and received by the NCS is known, the ML evaluator module 222 can be programmed to associate each respective task of the task data 212 that was implemented by the NCS during the mission with the corresponding behavioral state of the ML algorithm 202 and the subset of the sensor data 206. The ML evaluator module 222 can be programmed to provide task-behavior data 240 characterizing the association of each task of the task data 212 with a corresponding behavioral state of the ML algorithm 102, such as the learned behavioral state, and sensor information of the sensor data 206. In some examples, the ML evaluator module 222 can be programmed to associate respective mission information of the mission data 214 with corresponding tasks of the task data 212 and include this association as part of the task-behavior data 240.

In some, the memory 218 includes a decision tree module 242. In some examples, the decision tree module 242 can correspond to the decision tree module 136, as illustrated in FIG. 1. The decision tree module 242 can be programmed to provide GUI data 244 that includes a decision tree GUI with an interactive timeline for validation of the learned behavioral state of the ML algorithm 202. The decision tree module 242 can be programmed to generate the GUI data 244 based on the ML data 208, the vehicle data 210, the behavior identification data 238, and the task-behavior data 240. The decision tree module 242 can be programmed to provide the GUI data 244 to an output device 246 to display the decision tree GUI.

In some examples, the user can interact with the decision tree GUI to approve, modify, or delete the learned behavioral state of the ML algorithm 202. The user can employ an input device 248 to interact with the decision tree GUI. The input device 248 can be any type of device capable of supporting a communications interface to the ML analysis system 200. Exemplary input devices 248 can include a server, a mobile device, a mobile computer, a tablet, etc. The input device 248 can be connected to the ML analysis system 200 using a provided network (e.g., via common internet protocols), such as a wired or wireless network. In some examples, the output device 246 can be part of the input device 248 while in other examples the output device 246 is separate from the input device 248. By way of further example, the output device 246 can correspond to the output device 138 and the input device 248 can correspond to the input device 140, as illustrated in FIG. 1.

In some examples, the decision tree module 242 includes a GUI generator 250. The GUI generator 250 can be programmed to define start and end times for the interactive timeline. The start and end times can be defined based on the event timing data 216. Thus, the event timing data 216 can characterize a mission start time and a mission end time for the mission. Because the NCS is executing during the mission, the mission and start and times can correspond to a runtime of the NCS during the mission and thus to the runtime of the ML algorithm 202. In some examples, the interactive timeline of the decision tree GUI includes start and end time objects that the user can interact with to set an execution time window for the NCS. The execution time window can correspond to a period of time during the runtime of the NCS. By setting the execution time window, the decision tree module 242 can be programmed to retrieve corresponding (e.g., relevant) task and vehicle performance information from the vehicle data 210 and update the decision tree GUI to display the retrieved task and vehicle performance information for the user. In some examples, the decision tree module 242 can be programmed to retrieve corresponding mission information from the mission data 214 and update the decision tree GUI to display concurrently with the retrieved task and vehicle performance information the retrieved mission information.

In some examples, the decision tree module 242 includes a task object generator 252, a condition object generator 254, a mission object generator 256, and a behavior object generator 258. The task object generator 252 can be programmed to parse (e.g., search) the task data 212 to identify corresponding task information based on the set execution time window. The task object generator 252 can be programmed to transform a source code characterizing the corresponding tasks into a human-readable format (e.g., form). The task object generator 252 can be programmed to provide the corresponding task information in the human-readable format to the GUI generator 250. The GUI generator 250 can be programmed to populate a condition object of the decision tree GUI with the corresponding task information in the human-readable format.

In some examples, the condition object generator 254 can be programmed to parse the sensor data 206 to identify corresponding sensor information based on the set execution time window. The condition object generator 254 can be programmed to provide the corresponding sensor information (e.g., sensor values and corresponding sensor labels) to the GUI generator 250. The decision tree GUI can include a condition object. The GUI generator 250 can be programmed to populate the condition object of the decision tree GUI with the corresponding sensor. In some examples, the mission object generator 256 can be programmed to parse the mission data 214 to identify corresponding mission information based on the set execution time window. The mission object generator 256 can be programmed to transform a source code characterizing the corresponding mission information into a human-readable format. The mission object generator 256 can be programmed to provide the corresponding mission information in the human-readable format to the GUI generator 250. The GUI generator 250 can be programmed to populate a mission object of the decision tree GUI with the corresponding mission information in the human-readable format.

In some examples, the behavior object generator 258 can be programmed to evaluate the ML algorithm 202 relative to the corresponding task information retrieved from the task data 212 and transform a source code characterizing the learned behavioral state of the ML algorithm 202 into in a human-readable format. The behavior object generator 258 can be programmed to provide the learned behavioral state in the human-readable format to the GUI generator 250. The GUI generator 250 can be programmed to populate a behavior object of the decision tree GUI with the learned behavioral state in the human-readable format.

For example, during a flight of a UAV as the UAV approaches a turning point, the UAV can experience a large gust of wind that pushes the UAV off course. To return the UAV to an on course to meet a set required time of arrival (RTA) (e.g., for the mission) can require substantial banking. The UAV is configured to modify the turn initiation point, thrust, and bank angle to mitigate the effects of the large gust of wind. The modification can be based at least on part on the ML algorithm 202, as described herein, and thus can include the learned behavioral state of the ML algorithm 202. The vehicle data 210 can include a time at which the new behavior was implemented by the UAV (e.g., the new behavior occurred at 13:45), a location of the UAV for the new behavior (e.g., the location can correspond to GPS coordinates, such as 27°59'20.2"N 80°32'39.9"W), a cause of the new behavior in the UAV corresponding to sensed conditions (e.g., sensed wind at 35 knots from the east) that cause the UAV to behave in a new way and an effect of the new behavior by the UAV (e.g., a course deviation of 1000 feet west). An if/then statement relating to the developed (e.g., new) behavior in the UAV can be generated based on the cause and effect information and the task being implemented by the UAV. By way of example, if the "expected winds" at the "turn point" "exceed" "25 kts", then the UAV modifies turn point initiation. The behavior object generator 258 can be programmed to provide the if/then statement corresponding to the human readable code relating to the new behavioral state of the ML algorithm 202 based on the cause and effect information.

In some examples, the cause of the new behavior in the UAV can be associated with data generated by at least one sensor device or system on the UAV, and thus with a subset of data of the sensor data 206. Thus, the cause of the new behavior can correspond to a sensed phenomenon that causes some sort of correction in UAVs operation corresponding to a behavioral change in the UAV. The sensed phenomena can include detection of a nearby aircraft, weather conditions, weather cell, sensed wind, a flock of birds, etc. In some examples, the effect of the new behavior by the UAV can be associated with a causal factor that influenced or caused the UAV operation resulting in the behavioral change in the UAV. The effect of the new behavior can be associated with a subset of data of the sensor data 206. The subset of data of the sensor data 206 associated with the cause and effect of the new behavior and then can be employed to provide the if/then statement. Thus, the behavior developed by the UAV can be characterized by an if/then statement by the behavior object generator 258 for behavior object generation, as described herein.

In some examples, the behavior object includes an approve object, a delete object and a modify object. The user can interact with the approve object to generate user input data 260. The user input data 260 can indicate that the user approves of the learned behavioral state of the ML algorithm 202 for future use. The decision tree module 242 can be programmed to the store the learned behavioral state as part of the library of approved behavioral states 226 for the ML algorithm 202 based on the user input data 260. Thus, in future evaluations of the ML algorithm 202, the ML evaluator module 222 can be programmed to process the learned behavioral state as an approved behavioral state, and thus not require that the user approve the learned behavioral state via the decision tree GUI.

In some examples, the user can interact with the delete object to update the learned behavioral state from the ML algorithm 202. The user can interact with the delete object to generate the user input data 260 indicative of deleting the learned behavioral state from the ML algorithm 202. The decision tree module 242 can be programmed to generate the behavior evaluation data 228 to indicate that the learned behavioral state of the ML algorithm 202 is to be deleted corresponding to updating the at least one parameter for the learned behavioral state of the ML algorithm 202. The ML behavior adjustment module 230 can be programmed to remove (e.g., delete) the learned behavioral state to provide the updated ML algorithm 232, as described herein.

In some examples, the learned behavioral state includes consideration of respective sensor information (e.g., turbulence forecast information) of the sensor data 206 prior to executing a respective task, for example, a change of heading task for the UV. The user can interact with the delete object, such that for future executions of the respective task, the ML algorithm 202 does not emphasize the respective information (e.g., turbulence forecast information) corresponding to deleting the learned behavioral state from the ML algorithm 202. Thus, the ML behavior adjustment module 230 can be programmed to update the at least one parameter of the learned behavioral state of the ML algorithm 202, such that the ML algorithm 202 deemphasizes (e.g., assigns a lower weight value to) the turbulence forecast information, such that the turbulence information is not considered in a future change of heading task.

In some examples, the user can interact with the modify object. The ML decision tree module 242 can be programmed to request ML update information for the at least one parameter for the learned behavioral state of the ML algorithm 202. The user can interact with the modify object to generate the user input data 260 corresponding to the ML update information. Thus, the user can modify (e.g., update) the at least one parameter for the learned behavioral state of the ML algorithm 202. The decision tree module 242 can be programmed to generate the behavior evaluation data 228 to indicate modification of the at least one parameter for the learned behavioral state of the ML algorithm 202. The ML behavior adjustment module 230 can be programmed to update the at least one parameter for the learned behavioral state of the ML algorithm 202 to provide the updated ML algorithm 232. In some examples, the GUI generator 250 employs a behavior recommendation engine 262. The behavior recommendation engine 262 can employ ML learning techniques to evaluate the learned behavioral state of the ML algorithm 202 to provide a behavior recommendation. The behavior recommendation can include a recommendation to modify or delete the learned behavioral state of the ML algorithm 202. The behavior recommendation engine 262 can be programmed to update the decision tree GUI with a behavior recommendation object and populate the behavior recommendation object with the behavior recommendation.

Accordingly, the ML analysis system 200 allows for a postmortem analysis of the ML algorithm 202, such that learned behavioral states of the ML algorithm 202 can be validated (e.g., approved, modified, or deleted). The validation can be based on the library of approved behavioral states 226 or the user-input data 260 provided based on the user's interaction with the decision tree GUI. The decision tree GUI enables the user to select and examine parameters of the decision-making process of the ML algorithm 202 that caused the ML algorithm 202 to have the learned behavioral state. By the user selecting start and end times via the interactive time objects, the user can narrow down to a particular period of time of an operational timeline of the NCS and thus the ML algorithm 202 for ML behavioral evaluation (e.g., understand how the ML algorithm 202 behaved). The user can alter the ML algorithm 202 learning process via the decision tree GUI to ensure that the ML algorithm 202 will operate as desired in the future. Updating of the ML algorithm is a time consuming and skill intensive process, due to a complex nature of the user having to review thousands of lines of code to determine behavioristic changes of the ML algorithm 202. By employing the ML analysis system 200, the user can determine how the ML algorithm is behaving more efficiently and does not require that the user understand a native coding language in which the ML algorithm 202 was prepared.

Figure 3:
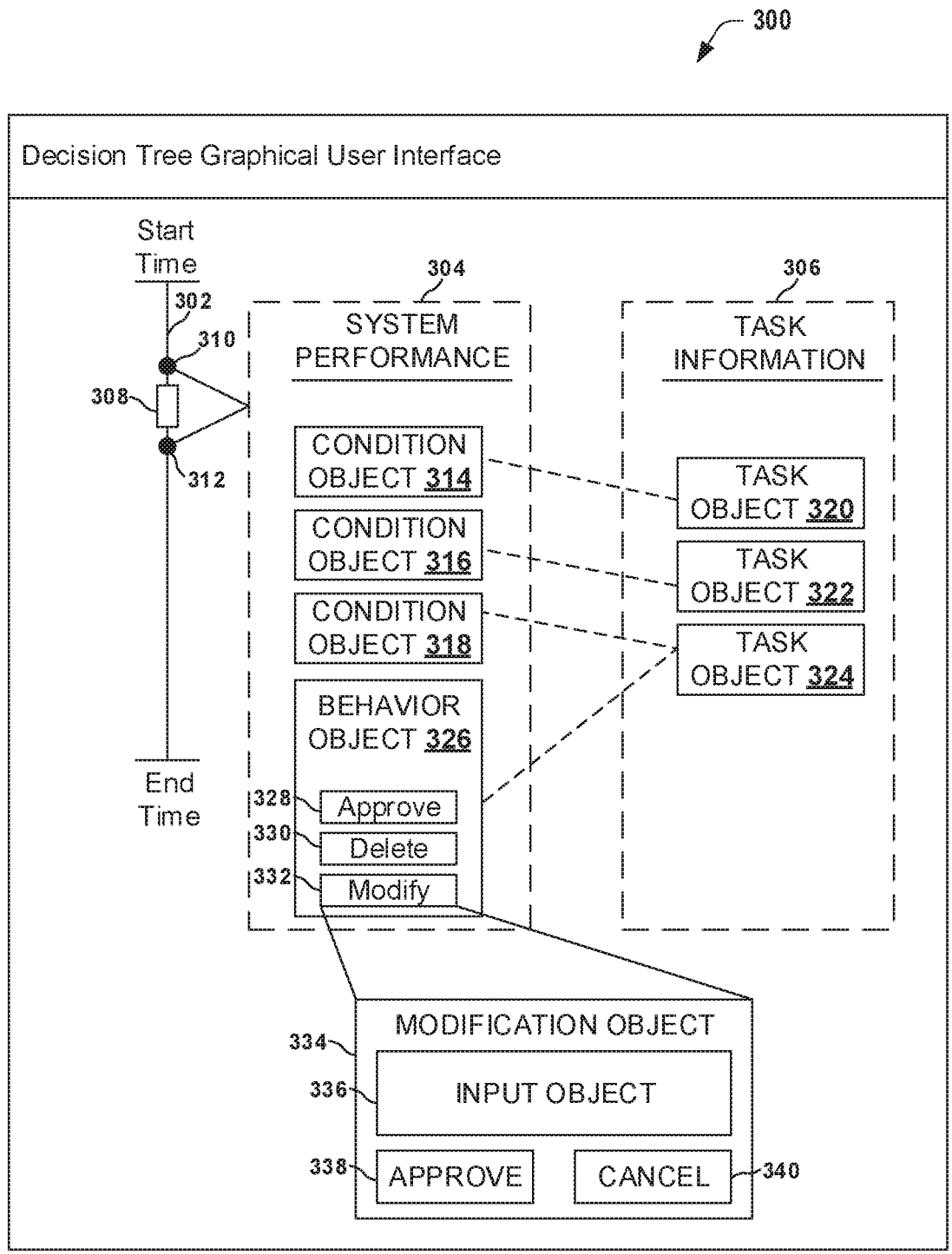
FIG. 3 illustrates an example of a decision tree user interface (GUI).

FIG. 3 illustrates an example of a decision tree GUI 300 for behavior validation of a ML algorithm. The ML algorithm can correspond to the ML algorithm 102, as illustrated in FIG. 1 or the ML algorithm 202, as illustrated in FIG. 2. Therefore, reference may be made to the examples of FIGS. 1 and 2 in the following description of the example of FIG. 3. The decision tree GUI 300 can be provided by a decision tree module, such as the decision tree module 136, as illustrated in FIG. 1 or the decision tree module 242, as illustrated in FIG. 2. The decision tree module can be programmed to provide GUI data (e.g., the GUI data 244, as illustrated in FIG. 2) that includes the decision tree GUI 300, as described herein. The decision tree GUI 300 can be employed during a postmortem analysis of the ML algorithm, such that learned behavioral states of the ML algorithm can be validated (e.g., approved, modified, or deleted). The decision tree GUI 300 can be associated with an operation of a processing device, such as the processing device 106, as illustrated in FIG. 1. In some examples, the processing device corresponds to an NCS of a UV, as described herein. The decision tree GUI 300 can characterize tasks implemented by the processing device that causes a system (e.g., the system 108, as illustrated in FIG. 1) to implement actions, and further characterize corresponding system conditions (e.g., a performance of a system). In some examples, the decision tree GUI 300 can characterize learned behavioral states of the ML algorithm that caused changes in the performance of the system.

The decision tree GUI 300 includes an interactive timeline 302, a system performance information object 304, and a task information object 306. The system performance information object 304 can characterize the corresponding system conditions of the system. The task information object 306 can characterize the tasks implemented by the processing device. The interactive timeline 302 includes start and end times. The start and end times can define (e.g., specify) a runtime for the processing device. As such, the start and end times can correspond to start and end times for the execution of tasks implemented by the processing device.

The interactive timeline 302 includes a behavior alert object 308. The behavior alert object 308 can be indicative of the learned behavioral state of the ML algorithm. Interactive time objects 310 and 312 can be set (e.g., in response to user input, such as the input device 140, as illustrated in FIG. 1) to set an execution time window for the processing device. The interactive time objects 310 and 312 can be set to include the behavior alert object 308. The decision tree module can be programmed to update the system performance information object 304 and the task information object 306 based the execution time window to display on an output device (e.g., the output device 138, as illustrated in FIG. 1) relevant system performance and task information for the processing device and system.

The system performance object 304 can include condition objects 314, 316, and 318. Each condition object 314, 316, and 318 can be associated with a performance state of the system at an instance of time between the start and end times. The decision tree module can be programmed to populate each condition object 314, 316, and 318 with corresponding system condition information provided by a condition object generator (e.g., the condition object generator 254, as illustrated in FIG. 2). Although FIG. 3 illustrates three condition objects 314, 316, and 318, in other examples, there can be more than three condition objects or less than three conditions objects. Each condition object 314, 316, and 318 can be associated with at least one task object 320, 322, and 324 of the task information object 306. The decision tree module can be programmed to populate each task object 320, 322, and 324 with corresponding task information provided by a task object generator (e.g., the task object generator 252, as illustrated in FIG. 2). An association of each condition object 314, 316, and 318 with a corresponding task object 320, 322, and 324 is illustrated in FIG. 3 with a dashed line. Each task object 320, 322, and 324 can characterize (e.g., identify) a task implemented by the processing device. In some examples, the system performance information object 304 includes a behavior object 326. The decision tree module can be programmed to populate the behavior object 326 with corresponding learned behavioral state information characterizing the learned behavioral state of the ML algorithm (e.g., in a human-readable format). The corresponding learned behavioral state can be provided by a behavior object generator (e.g., the behavior object generator 258, as illustrated in FIG. 2).

In some examples, the decision tree module can be programmed to position the behavior object 326 in proximity to a corresponding task object 324 characterizing a respective task. In some examples, the behavior object 326 can be associated with the task object, which is illustrated in FIG. 3 with a dashed line. By associating the behavior object 326 with the task object 324 that is associated with a corresponding condition object 318, the user can readily determine (e.g., identify) the corresponding system conditions associated with the learned behavioral state of the ML algorithm.

In some examples, the behavior object 326 includes an approve object 328, a delete object 330 and a modify object 332. The user can interact with the approve object 328 to approve the learned behavioral state of the ML algorithm 102 for future use, as described herein. The decision tree module can be programmed to the store the learned behavioral state as part of a library of approved behavioral states (e.g., the library of approved behavioral states 226, as illustrated in FIG. 2). To modify the learned behavioral state, such as to update at least one parameter of a learning process of the ML algorithm, the user can interact with the modify object 332. The decision tree module can be programmed to update the decision tree GUI to include a modification object 334 in response to activating the modify object 332.

The modification object 334 can include an input object 336 for receiving ML algorithm parameter update information (e.g., a new value for the at least one parameter of the learning process) for the learned behavioral state for the respective task being implemented by the processing device 106. The modification GUI can further include an approve modification object 338 and a cancel modification object 340. The user can interact with the approve modification object 338 to communicate the ML algorithm parameter update information as behavior evaluation data (e.g., the behavior evaluation data 126, as illustrated in FIG. 1 or the behavior evaluation data 228, as illustrated in FIG. 2) to a ML behavior adjustment module to modify the learned behavioral state of the ML algorithm, as described herein. In some examples, the user can interact with the cancel modification object 338 and cause the decision tree module to update the decision tree GUI to remove the modification object 334. Accordingly, the user can employ the decision tree GUI 300 to modify the at least one parameter for the learned behavioral state of the ML algorithm. In some examples, the user can interact with the delete object 330 to delete the learned behavioral state from the ML algorithm, as described herein. Accordingly, the decision tree GUI 300 allows for a retrospective interrogation of the ML algorithm, such that the user to understand how the ML algorithm behaved during runtime of the processing device, and thus the ML algorithm. The decision tree GUI 300 can be employed to approve, delete, or modify learned behavioral states of the ML algorithm based on the user's interaction with the decision tree GUI 300.

Figure 4:
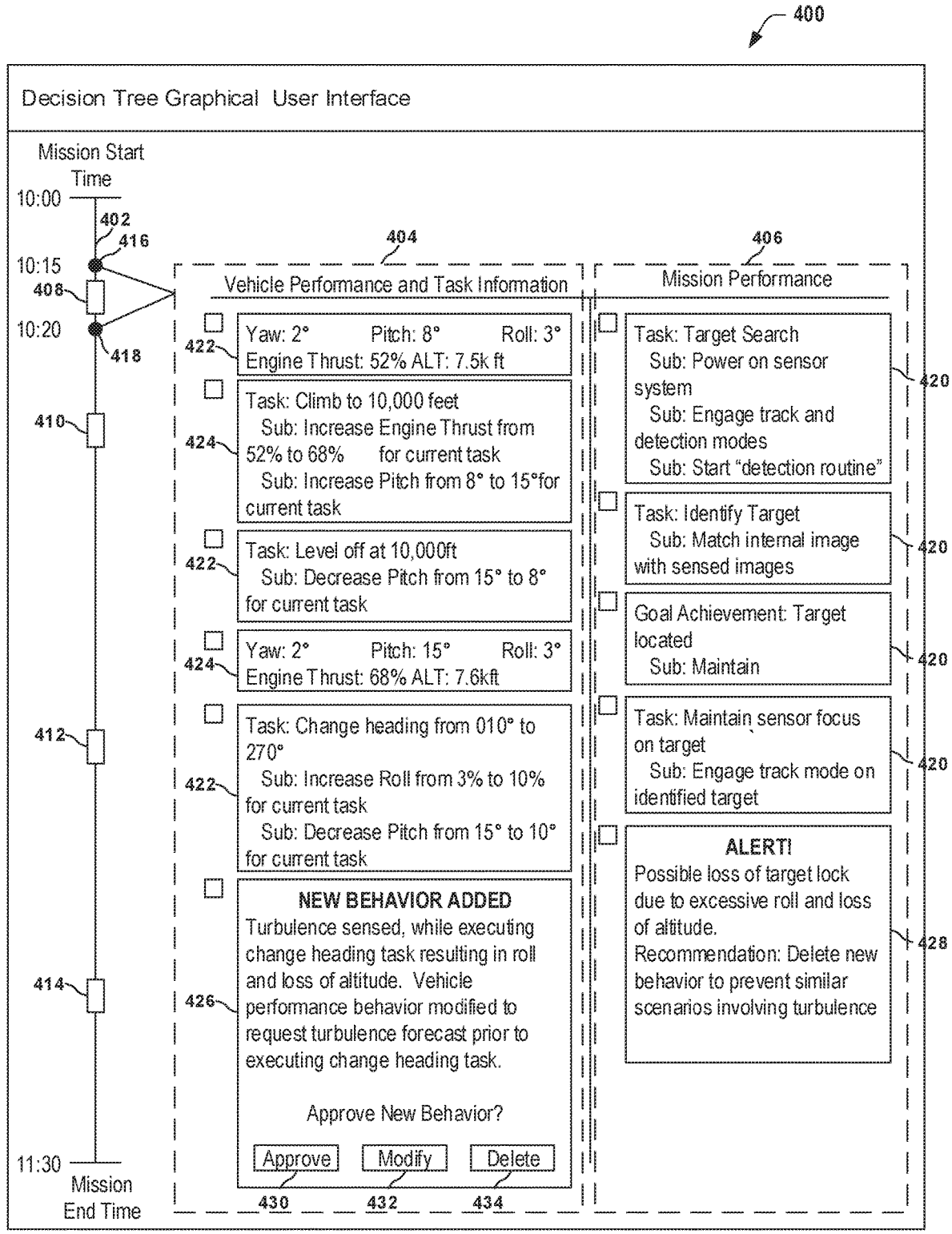
FIG. 4 illustrates an example of another decision tree GUI.

FIG. 4 illustrates an example of a decision tree GUI 400 for ML algorithm behavior validation. The ML algorithm can correspond to the ML algorithm 102, as illustrated in FIG. 1 or the ML algorithm 202, as illustrated in FIG. 2. Therefore, reference may be made to the examples of FIGS. 1 and 2 in the following description of the example of FIG. 4. The decision tree GUI 400 can be provided by a decision tree module, such as the decision tree module 136, as illustrated in FIG. 1 or the decision tree module 242, as illustrated in FIG. 2. The decision tree module can be programmed to provide GUI data (e.g., the GUI data 244, as illustrated in FIG. 2) that includes the decision tree GUI 400, as described herein. The decision tree GUI 400 can be used to implement a postmortem analysis of the ML algorithm, such that learned behavioral states of the ML algorithm during a UV mission can be validated (e.g., approved, modified, or deleted). The decision tree GUI 400 can be associated with an operation of an NCS of the UV. The decision tree GUI 300 can characterize tasks implemented by the NCS during a mission being implemented by the UV, and further characterize corresponding vehicle performance conditions of the UV. In some examples, the decision tree GUI 400 can characterize learned behavioral states of the ML algorithm that caused changes in the performance of the UV.

The interactive timeline 402 includes mission start and end times for the mission. Because the NCS is executing during the mission, the mission start and end times can correspond to start and end times for execution for the NCS and thus execution of the ML algorithm. For example, a mission start time of 10:00 can correspond to a start of execution of the NCS and a mission stop time of 11:30 can correspond to an end execution of the NCS. The decision tree module can be programmed to generate the interactive timeline 402 with behavior alert objects 408, 410, 412, and 414. The behavior alert objects 408, 410, 412, and 414 can be indicative of learned behavioral state of the ML algorithm according to which the NCS executed a corresponding task to cause the UV to implement a respective action (e.g., movement). Although FIG. 4 illustrates four graphical behavior alert objects, in other examples, more or less graphical alert behavior objects can be generated by the decision tree module.

In some examples, a user can interact with interactive time objects 416 and 418 of the interactive timeline 402 via an input device (e.g., the input device 140, as illustrated in FIG. 1) to specify an execution time window for the NCS. The interactive time objects 416 and 418 can be set to include the behavior alert object 408, as illustrated in FIG. 4. The decision tree module can be programmed to update the vehicle performance and task information object 404 and the mission performance object 406 with corresponding vehicle performance and task information and mission performance information for the UV that was generated during the mission based on the execution time window.

The mission performance object 406 can include mission objects 420 that can characterize corresponding mission task information. Each mission object 420 can characterize (e.g., identify) corresponding mission information for the UAV during the execution time window. The decision tree module can be programmed to populate each mission object 420 with corresponding mission information provided by a mission object generator (e.g., the mission object generator 256, as illustrated in FIG. 2). The mission object generator can be programmed to retrieve the corresponding mission information from mission data (e.g., the mission data 214, as illustrated in FIG. 2) stored in a memory of the ML analysis system. The vehicle performance and task information object 404 includes condition objects 422 and task objects 424. The decision tree module can be programmed to populate each condition object 422 with corresponding sensor information from sensor data (e.g., the sensor data 206, as illustrated in FIG. 1) stored in the memory. The corresponding sensor information can be provided by a condition object generator (e.g., the condition object generator 254, as illustrated in FIG. 2). The decision tree module can be programmed to populate each task object 424 with corresponding task information from task data (e.g., the task data 212, as illustrated in FIG. 1) stored in the memory. The corresponding task information can be provided by a task object generator (e.g., the task object generator 252, as illustrated in FIG. 2).

In some examples, while implementing a respective task during the mission, for example, a change heading task, the UAV experiences a roll and loss in altitude, such as in response to turbulence. The turbulence can cause the ML algorithm to change the decision-making process corresponding to the learned behavioral state. As such, the vehicle performance and task information object 404 can include a behavior object 426. The behavior object 426 can be positioned on the decision tree GUI 400 in proximity to a corresponding task object 424 characterizing the respective task. The decision tree module can be programmed to populate the behavior object 426 with corresponding learned behavioral state information characterizing the learned behavioral state of the ML algorithm (e.g., in a human-readable format). The corresponding learned behavioral state can be provided by a behavior object generator (e.g., the behavior object generator 258, as illustrated in FIG. 2).

In the excessive turbulence example, the behavior object 426 can indicate that the decision process of the ML algorithm was modified to consider (e.g., weigh) a turbulence forecast before executing the change heading task.

In some examples, the mission performance object 406 includes a recommendation object 428. The decision tree module can be programmed to evaluate the learned behavioral state of the ML algorithm and provide a behavior recommendation (e.g., solution) for the learned behavioral state of the ML algorithm. By way of example, the recommendation object 428 includes a recommendation to delete the new behavior (e.g., the learned behavioral state of the ML algorithm). The user can employ the recommendation of the recommendation object 428 for validation of the learned behavioral state.

By way of example, the behavior object 426 includes an approve object 430, a modify object 432, and a delete object 434. The user can interact with the approve object 432 to approve the learned behavioral state of the ML algorithm 102 for future use, as described herein. The decision tree module can be programmed to the store the learned behavioral state as part of a library of approved behavioral states (e.g., the library of approved behavioral states 226, as illustrated in FIG. 2). To modify the learned behavioral state, such as to update at least one parameter of the learning process of the ML algorithm, the user can interact with the modify object 332 to cause the learned behavioral state to be modified (e.g., as described herein with respect to FIG. 3). In some examples, the user can interact with the delete object 434 to delete the learned behavioral state from the ML algorithm, such that the learned behavioral state is deleted, as described herein. Accordingly, the decision tree GUI 400 can be employed to validate learned behavioral states of the ML algorithm based on the user's interaction with the decision tree GUI 400. The decision tree GUI 400 allows for a retrospective interrogation of the ML algorithm being implemented in an UV environment. The user can employ the decision tree GUI 400 to understand how the ML algorithm behaved during the mission being implemented by the UV in response to changes in environmental conditions. The user can alter the ML algorithm learning process via the decision tree GUI 400 to ensure that the ML algorithm will operate as desired in the future missions.

Figure 5:
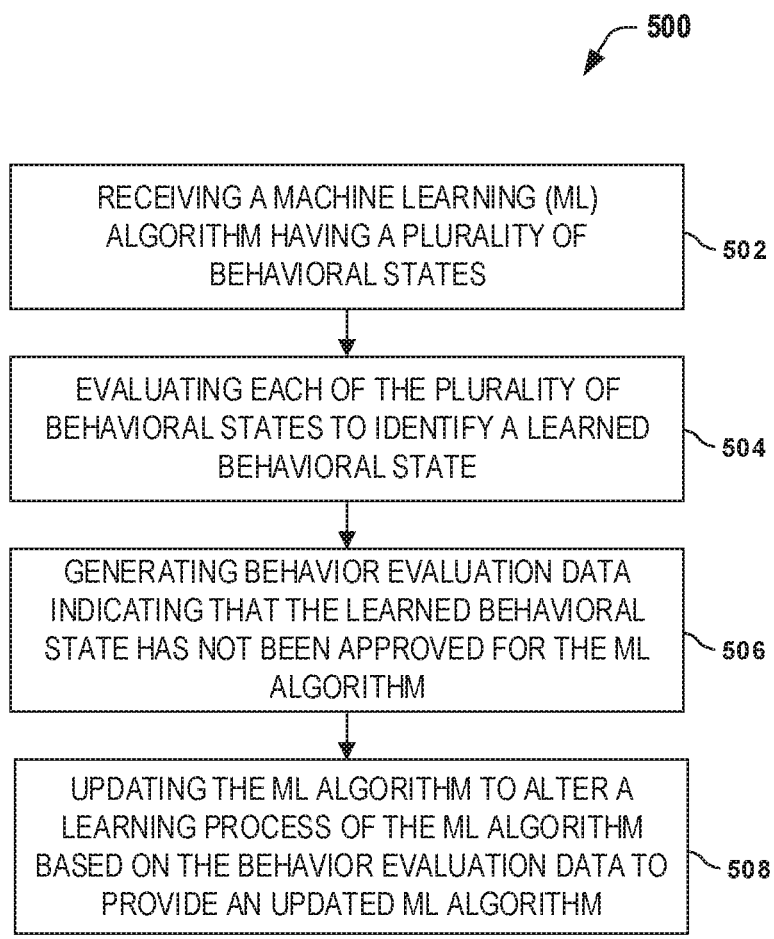
FIG. 5 is a flow diagram illustrating an example of a method for validating a behavior of a ML algorithm.
Figure 6:
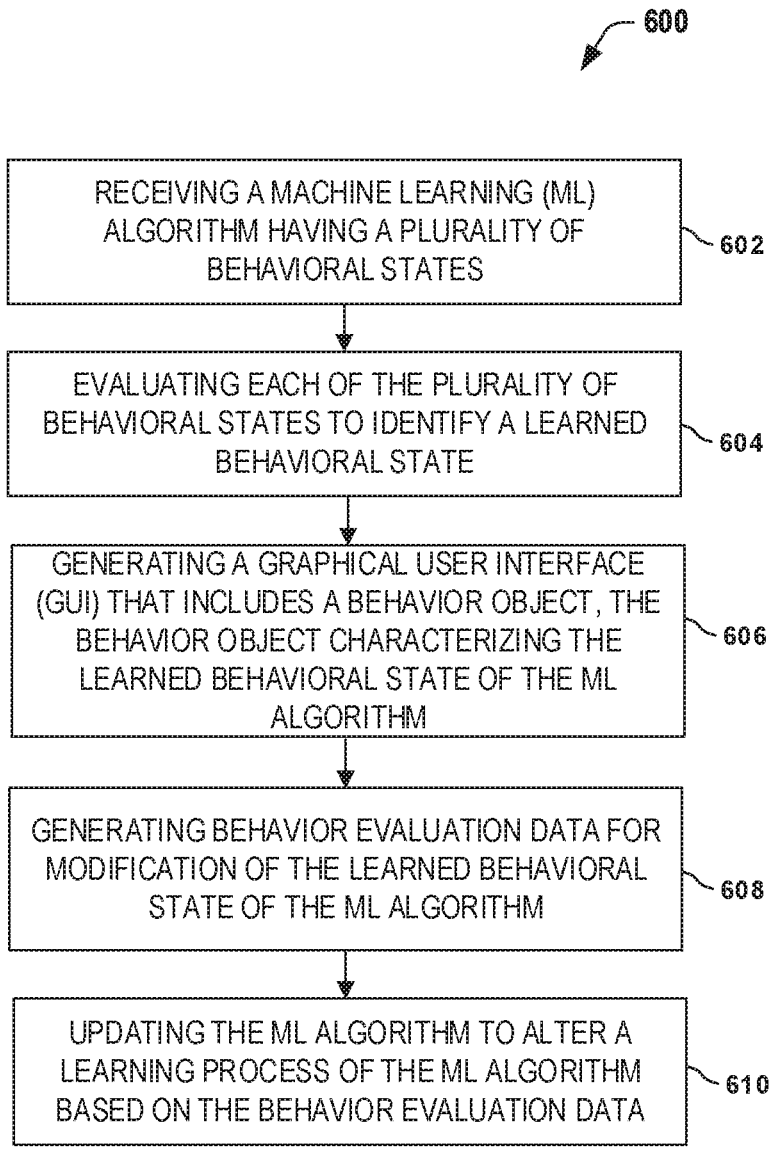
FIG. 6 is a flow diagram illustrating another example of a method for validating a behavior of a ML algorithm.

In view of the foregoing structural and functional features described above, example methods will be better appreciated with reference to FIGS. 5-6. While, for purposes of simplicity of explanation, the example method of FIGS. 5-6 is shown and described as executing serially, it is to be understood and appreciated that the example methods are not limited by the illustrated orders, as some actions could in other examples occur in different orders, multiple times and/or concurrently from that shown and described herein.

FIG. 5 is a flow diagram illustrating an example of a method 500 for validating a behavior of a ML algorithm. The ML algorithm can correspond to the ML algorithm 102, as illustrated in FIG. 1 or the ML algorithm 202, as illustrated in FIG. 2. Therefore, reference may be made to the examples of FIGS. 1-4 in the following description of the example of FIG. 5. The method 500 can be implemented by a ML analysis system, such as the ML analysis system 112, as illustrated in FIG. 1 or the ML analysis system 200, as illustrated in FIG. 2. At 502, the method 500 receives the ML algorithm having a plurality of behavioral states. At 504, the method 500 evaluates each of the plurality of behavioral states to identify a learned behavioral state by comparing each of the plurality of behavioral states to approved behavioral states (e.g., such as the library of approved behavioral states 226, as illustrated in FIG. 2) for the ML algorithm. At 506, the method 500 generates behavior evaluation data (e.g., the behavior evaluation data 126, as illustrated in FIG. 1 or the behavior evaluation data 228, as illustrated in FIG. 1) based on the evaluation. The behavior evaluation data can indicate that the learned behavioral state is to be deleted from the ML algorithm. At 508, the method 500 updates the ML algorithm to alter a learning process of the ML algorithm by modifying the learned behavioral state of the ML algorithm to provide an updated ML algorithm.

FIG. 6 is a flow diagram illustrating another example of a method 600 for validating a behavior of a ML algorithm. The ML algorithm can correspond to the ML algorithm 102, as illustrated in FIG. 1 or the ML algorithm 202, as illustrated in FIG. 2. Therefore, reference may be made to the examples of FIGS. 1-4 in the following description of the example of FIG. 6. The method 600 can be implemented by a ML analysis system, such as the ML analysis system 112, as illustrated in FIG. 1 or the ML analysis system 200, as illustrated in FIG. 2. At 602, the method 600 receives the ML algorithm having a plurality of behavioral states. At 604, the method 600 evaluates the plurality of behavioral states by comparing each of the plurality of behavioral states to approved behavioral states for the ML algorithm (e.g., such as the library of approved behavioral states 226, as illustrated in FIG. 2) to identify a learned behavioral state among the plurality of behavioral states. At 606, the method 600 generates (e.g., via the decision tree module 136, as illustrated in FIG. 1 or the decision tree module 242, as illustrated in FIG. 2) a decision tree GUI that includes a behavior object characterizing the learned behavioral state of the ML algorithm. At 608, the method 600 generates behavior evaluation data characterizing one of a modification or a deletion of the learned behavioral state of the ML algorithm based on an interaction with the behavior object by a user. The behavior evaluation data can include one of non-approval information indicating that the learned behavioral state has not been approved for the ML algorithm and algorithm update information characterizing a change to a learning process for the learned behavioral state of the ML algorithm. In some examples, the change can correspond to updating at least one parameter value of the learning process for the learned behavioral state. At 610, the method 600 updates the ML algorithm to update the learning process of the ML algorithm to provide an updated ML algorithm.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A computer implemented method for post-execution evaluation of a machine-learning (ML) algorithm, the method comprising:

receiving ML behavior data comprising a post-execution version of the ML algorithm by a processing device of a system, the ML algorithm having a plurality of behavioral states, the plurality of behavioral states corresponding to different decision-making states of the ML algorithm;

evaluating the plurality of behavioral states by comparing each of the plurality of behavioral states to a library of approved behavioral states for the ML algorithm to identify a given behavioral state from the plurality of behavioral states of the ML algorithm, the given behavioral state corresponding to a decision-making state of the ML algorithm that is not part of the library of approved behavioral states for the ML algorithm;

generating a graphical user interface (GUI) that provides interactive time objects on an interactive timeline, the interactive time objects being controllable based on user input to define a start and end time specifying a user selectable time window to control a behavior of the ML algorithm;

in response to user selections of a first interactive time object from the interactive time objects and a second interactive time object from the interactive time objects to specify the user selectable time window, displaying in the GUI a plurality of graphical objects comprising:

a behavior object within the user selectable time window characterizing the given behavioral state of the ML algorithm;

a plurality of condition objects associated with a performance state of the system at an instance of time within the user selectable time window; and a plurality of task objects that identify tasks executed by the processing device of the system within the user selectable time window, wherein each condition object is associated with at least one task object;

wherein the behavior object and a first condition object of the plurality of condition objects are visually indicated by the GUI to be associated with a first task object of the plurality of task objects and a second condition object of the plurality of condition objects is visually indicated by the GUI to be associated with a second task object of the plurality of task objects, wherein the first condition object is different from the second condition object, and the first task object is different from the second task object;

generating behavior evaluation data based on user input to the GUI, the behavior evaluation data indicating one of that the given behavioral state of the ML algorithm is an approved behavioral state for the ML algorithm, that the given behavioral state is not an approved behavioral state of the ML algorithm and an update to the learning process for the given behavioral state of the ML algorithm; and updating the ML algorithm to alter a learning process of the ML algorithm by modifying the given behavioral state of the ML algorithm to provide an updated ML based on the behavior evaluation data.

2. The computer implemented method of claim 1, wherein the ML algorithm is programmed to control a behavior of the system, wherein during the execution of the ML algorithm on the processing device the ML algorithm updates the learning process to provide the post-execution version of the ML algorithm, wherein each update to the learning process corresponds to a respective behavioral state of the plurality of behavioral states of the ML algorithm, each update to the learning process comprises updating at least one parameter of the learning process.

3. The computer implemented method of claim 2, wherein the evaluating comprises comparing the at least one parameter of the learning process for each of the plurality of behavioral states of the ML algorithm to corresponding parameters of approved behavioral states of the library of approved behavioral states to identify the given behavioral state.

4. The computer implemented method of claim 3, further comprising generating behavior identification data identifying another behavioral state from the plurality of behavioral states of the ML algorithm based on the evaluation, the other behavioral state corresponding to another decision-making state of the ML algorithm that is not part of the library of approved behavioral states for the ML algorithm.

5. The computer implemented method of claim 4, further comprising:
generating additional behavior evaluation data based on an interaction with the behavior object by a user via an input device, the additional behavior evaluation data indicating one of that the other behavioral state of the ML algorithm is an approved behavioral state for the ML algorithm, that the other behavioral state of the ML algorithm is not an approved behavioral state for the ML algorithm, an update to the learning process for the other behavioral state of the ML algorithm.

6. The computer implemented method of claim 5, further comprising updating the library of approved behavioral states to include the other behavioral state based on the additional behavior evaluation data indicating that the other behavioral state is an approved behavioral state for the ML algorithm.

7. The computer implemented method of claim 5, further comprising updating the ML algorithm to further alter the learning process of the ML algorithm by updating the other behavioral state of the ML algorithm based on the additional behavior evaluation data indicating one of that the other behavioral state of the ML algorithm is not the approved behavioral state for the ML algorithm and the update to the learning process for the other behavioral state of the ML algorithm.

8. The computer implemented method of claim 7, wherein the change to the learning process corresponds to an updated parameter value for the at least one parameter of the learning process for the other behavioral state of the ML algorithm.

9. The computer implemented method of claim 8, further comprising updating the ML algorithm to further alter the learning process of the ML algorithm by updating the other behavioral state of the ML algorithm based on the additional behavior evaluation data.

10. The computer implemented method of claim 9, further comprising:
generating an updated version of the other behavioral state based on the updated parameter value for the at least one parameter of the learning process for the other behavioral state of the ML algorithm; and
updating the library of approved behavioral states to include the updated version of the other behavioral state.

11. The computer implemented method of claim 10, wherein the system corresponds to an unmanned vehicle (UV) comprising one of an unmanned aerial vehicle (UAV), an unmanned ground vehicle (UGV) and an unmanned surface vehicle (USV), the processing device corresponding to a navigation and control system (NCS) of the UV, the ML algorithm being programmed to control a performance of the NCS to control the behavior of the UAV.

12. A system for post-execution evaluation of a machine-learning (ML) algorithm, the system comprising:
memory to store machine readable instructions and data, the data comprising a post-execution version of the ML algorithm by a processing device of a system, the ML algorithm having a plurality of behavioral states, the plurality of behavioral states corresponding to different decision-making states of the ML algorithm; and
one or more processors to access the memory and execute the machine readable instructions, the machine readable instructions comprising:
a ML evaluator module programmed to:
generate behavior identification data identifying a given behavioral state from the plurality of behavioral states of the ML algorithm, the given behavioral state corresponding to a decision-making state of the ML algorithm that the ML algorithm learned during the execution of the ML algorithm;
a decision tree module programmed to:
generate a graphical user interface (GUI) that provides interactive time objects on an interactive timeline, the interactive time objects being controllable based on user input to define a start and end time specifying a user selectable time window to control a behavior of the ML algorithm;
in response to user selections of a first interactive time object from the interactive time objects and a second interactive time object from the interactive time objects to specify the user selectable time window, display in the GUI a plurality of graphical objects comprising:
a behavior object within the user selectable time window characterizing the given behavioral state of the ML algorithm, the behavior object being generated based on the behavior identification data;
a plurality of condition objects associated with a performance state of the system at an instance of time within the user selectable time window; and
a plurality of task objects that identify tasks executed by the processing device of the system within the user selectable time window, wherein each condition object is associated with at least one task object;
wherein the behavior object and a first condition object of the plurality of condition objects are visually indicated by the GUI to be associated with a first task object of the plurality of task objects; and a second condition object of the plurality of condition objects is visually indicated by the GUI to be associated with a second task object of the plurality of task objects, wherein the first condition object is different from the second condition object, and the first task object is different from the second task object;
wherein the plurality of graphical objects of the GUI further comprises a recommendation object that provides a recommendation to one of delete, modify or accept the given behavioral state corresponding to the behavior object;
generate behavior evaluation data based on an interaction with the behavior object of the GUI by a user via an input device, the behavior evaluation data indicating one of that the given behavioral state of the ML algorithm is an approved behavioral state for the ML algorithm, that the given behavioral state of the ML algorithm is not an approved behavioral state for the ML algorithm, an update to a learning process for the given behavioral state of the ML algorithm; and
a ML behavior adjustment module programmed to:
update the ML algorithm to alter the learning process of the ML algorithm based on the behavior evaluation data.

13. The system of claim 12, wherein to update the ML algorithm to alter the learning process of the ML algorithm comprises one of:
- deleting the given behavioral state from the ML algorithm to alter the learning process based on the behavior evaluation data indicating that the given behavioral state of the ML algorithm is not an approved behavioral state for the ML algorithm; and
- updating at least one parameter of the learning process for the given behavioral state of the ML algorithm with an updated parameter value to alter the learning process of the ML algorithm based on the behavior evaluation data indicating an update to a learning process for the given behavioral state of the ML algorithm.

14. The system of claim 13, wherein to generate the behavior identification data comprises evaluating the plurality of behavioral states of the ML algorithm relative to a library of approved behavioral states for the ML algorithm to identify the given behavioral state.

15. The system of claim 14, wherein the system is an unamend vehicle that executed the ML algorithm for a period of time to provide the post-execution version of the ML algorithm.

16. One or more non-transitory computer-readable media having instructions executable by a processor, the instructions programmed to perform a method for evaluation of a machine-learning (ML) algorithm, the ML algorithm being programmed to execute on a navigation and control system (NCS) of an unmanned vehicle (UV) configured to perform a mission, the method comprising:
- receiving ML behavior data comprising a post-execution version of the ML algorithm with a plurality of behavioral states, the plurality of behavioral states corresponding to different decision-making states of the ML algorithm, each decision making state of the ML algorithm causing a respective change to a learning process of the ML algorithm during the mission being performed by the UV;
- generating behavior identification data identifying a given behavioral state among the plurality of behavioral states of the ML algorithm, the given behavioral state corresponding to a respective decision-making state of the ML algorithm that the ML algorithm learned during the mission being performed by the UV;
- generating a graphical user interface (GUI) that provides interactive time objects on an interactive timeline, the interactive time objects being controllable based on user input to define a start and end time specifying a user selectable time window to control a behavior of the ML algorithm;
- in response to user selections of a first interactive time object from the interactive time objects and a second interactive time object from the interactive time objects to specify the user selectable time window, displaying in the GUI a plurality of graphical objects comprising:
  - a behavior object within the user selectable time window, the behavior object characterizing the given behavioral state of the ML algorithm, the behavior object being generated based on the behavior identification data;
  - a plurality of condition objects associated with a performance state of the UV at an instance of time within the user selectable time window; and
  - a plurality of task objects that identify tasks executed by the NCS of the UV within the user selectable time window, wherein each condition object is associated with at least one task object;
- wherein the behavior object and a first condition object of the plurality of condition objects are visually indicated by the GUI to be associated with a first task object of the plurality of task objects; and a second condition object of the plurality of condition objects is visually indicated by the GUI to be associated with a second task object of the plurality of task objects, wherein the first condition object is different from the second condition object, and the first task object is different from the second task object;
- generating behavior evaluation data based on an interaction of a user via an input device with the behavior object of the GUI, the behavior evaluation data indicating one of that the given behavioral state of the ML algorithm is an approved behavioral state for the ML algorithm, that the given behavioral state of the ML algorithm is not an approved behavioral state for the ML algorithm, an update to the learning process for the given behavioral state of the ML algorithm; and
- updating the ML algorithm to alter the learning process of the ML algorithm based on the behavior evaluation data to provide an updated ML algorithm for a subsequent mission performed by the UV.

17. The media of claim 16, wherein the generating of the behavior identification data comprises evaluating the plurality of behavioral states relative to a library of approved behavioral states for the ML algorithm to identify the given behavioral state.

18. The media of claim 17, wherein to update the ML algorithm to alter the learning process of the ML algorithm comprises updating at least one parameter of the learning process for the given behavioral state of the ML algorithm with an updated parameter value to alter the learning process of the ML algorithm based on the behavior evaluation data indicating an update to the learning process for the given behavioral state of the ML algorithm, the update to the learning process corresponding to a new value for at least one parameter for the learned behavioral state of the ML algorithm.

19. The media of claim 17, wherein to update the ML algorithm to alter the learning process of the ML algorithm comprises updating the given behavioral state from the ML algorithm to alter the learning process based on the behavior evaluation data indicating that the given behavioral state of the ML algorithm is not an approved behavioral state for the ML algorithm.

* * * * *